United States Patent
Takii et al.

(10) Patent No.: US 10,602,331 B2
(45) Date of Patent: Mar. 24, 2020

(54) INTER-VEHICLE COMMUNICATION SYSTEM, VEHICLE SYSTEM, VEHICLE ILLUMINATION SYSTEM AND VEHICLE

(71) Applicant: KOITO MANUFACTURING CO., LTD., Tokyo (JP)

(72) Inventors: Naoki Takii, Shizuoka (JP); Misako Kamiya, Shizuoka (JP); Toshihiko Kurebayashi, Shizuoka (JP); Masaaki Nakabayashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/244,687

(22) Filed: Jan. 10, 2019

(65) Prior Publication Data
US 2019/0215671 A1 Jul. 11, 2019

(30) Foreign Application Priority Data
Jan. 11, 2018 (JP) .................................. 2018-002779

(51) Int. Cl.
| H04W 4/46 | (2018.01) |
| B60Q 1/50 | (2006.01) |
| B60W 50/14 | (2020.01) |
| G02B 27/01 | (2006.01) |
| H04W 4/12 | (2009.01) |
| H04L 12/58 | (2006.01) |

(52) U.S. Cl.
CPC ............ *H04W 4/46* (2018.02); *B60Q 1/50* (2013.01); *B60W 50/14* (2013.01); *G02B 27/01* (2013.01); *H04L 51/00* (2013.01); *H04W 4/12* (2013.01); *B60W 2050/146* (2013.01)

(58) Field of Classification Search
None
See application file for complete search history.

(56) References Cited

U.S. PATENT DOCUMENTS

| 9,323,137 | B1 * | 4/2016 | Secord ................... | G03B 21/14 |
| 9,679,487 | B1 * | 6/2017 | Hayward ............... | G01C 21/34 |
| 9,842,496 | B1 * | 12/2017 | Hayward ............... | G01C 21/34 |
| 10,068,377 | B2 * | 9/2018 | Sisbot .................... | B60K 35/00 |
| 10,315,556 | B2 * | 6/2019 | Kawamata ............. | B60K 35/00 |
| 2007/0252723 | A1 * | 11/2007 | Boss ....................... | G08G 1/162 340/902 |
| 2008/0316053 | A1 * | 12/2008 | Boss ....................... | G08G 1/162 340/902 |
| 2011/0133916 | A1 * | 6/2011 | Suzuki ................... | B60K 35/00 340/435 |
| 2011/0248842 | A1 * | 10/2011 | Yang ...................... | G02B 27/01 340/435 |

(Continued)

FOREIGN PATENT DOCUMENTS

| FR | 3049529 A1 | * 10/2017 |
| JP | H09-277887 A | 10/1997 |

*Primary Examiner* — Chico A Foxx
(74) *Attorney, Agent, or Firm* — Osha Liang LLP

(57) ABSTRACT

An inter-vehicle communication system includes: a first vehicle including a message generator configured to generate a message and a first wireless communication unit configured to wirelessly transmit the generated message; a second vehicle including a second wireless communication unit configured to receive the message transmitted from the first vehicle; and a display device that is located in the second vehicle and is configured to display the message.

7 Claims, 10 Drawing Sheets

(56) References Cited

U.S. PATENT DOCUMENTS

| | | | | |
|---|---|---|---|---|
| 2012/0136538 A1* | 5/2012 | Schepp | ................. | B60W 30/09 |
| | | | | 701/41 |
| 2013/0318182 A1* | 11/2013 | Palnati | .................... | H04L 51/20 |
| | | | | 709/206 |
| 2014/0049384 A1* | 2/2014 | Mueller | ................. | B60Q 9/008 |
| | | | | 340/435 |
| 2014/0267726 A1* | 9/2014 | Lin | ........................ | G08G 1/166 |
| | | | | 348/148 |
| 2017/0032673 A1* | 2/2017 | Scofield | ............... | G08G 1/0112 |
| 2017/0057521 A1* | 3/2017 | Jain | ....................... | B60W 50/14 |
| 2017/0084174 A1* | 3/2017 | Suzuki | ................. | H04W 4/046 |
| 2017/0088038 A1* | 3/2017 | Geller | ..................... | B60Q 1/50 |
| 2017/0124864 A1* | 5/2017 | Popple | ................. | H04W 76/10 |
| 2018/0038953 A1* | 2/2018 | Choi | ........................ | B60R 21/00 |
| 2018/0059779 A1* | 3/2018 | Sisbot | ....................... | B60R 1/00 |
| 2018/0201189 A1* | 7/2018 | Kim | ........................ | B60Q 9/008 |
| 2019/0025584 A1* | 1/2019 | Dai | ........................... | A61F 9/08 |
| 2019/0052842 A1* | 2/2019 | Du | ............................ | B60R 1/00 |
| 2019/0095729 A1* | 3/2019 | Dai | .................... | G06K 9/00825 |
| 2019/0180616 A1* | 6/2019 | Masuike | ............... | G08G 1/09 |
| 2019/0200190 A1* | 6/2019 | Rios Cortes | ............ | H04W 4/46 |
| 2019/0210616 A1* | 7/2019 | Watkins | ............... | B60W 50/14 |

\* cited by examiner

INTER-VEHICLE COMMUNICATION SYSTEM, VEHICLE SYSTEM, VEHICLE ILLUMINATION SYSTEM AND VEHICLE

CROSS-REFERENCE TO RELATED APPLICATION

This application is based on and claims priority under 35 USC 119 from Japanese Patent Application No. 2018-002779 filed on Jan. 11, 2018, the contents of which are incorporated herein by reference.

TECHNICAL FIELD

The present disclosure relates to an inter-vehicle communication system. In addition, the present disclosure relates to a vehicle system, a vehicle illumination system and a vehicle including the vehicle illumination system.

BACKGROUND ART

Currently, research on an autonomous driving technology of an automobile has been actively conducted in countries, and the countries are considering the legislation so as to enable a vehicle (hereinafter, a "vehicle" refer to an automobile) to travel in an autonomous driving mode on public roads. Here, in the autonomous driving mode, a vehicle system autonomously controls traveling of a vehicle. Specifically, in the autonomous driving mode, the vehicle system autonomously performs at least one of a steering control (control of a traveling direction of the vehicle), a brake control and an accelerator control (control of braking and acceleration/deceleration of the vehicle) based on information (surrounding environment information) indicative of a surrounding environment of the vehicle and obtained from sensors such as a camera, a radar (for example, a laser radar or a millimeter wave radar) and the like. On the other hand, in a manual driving mode to be described later, a driver controls the traveling of the vehicle, as in most of conventional vehicles. Specifically, in the manual driving mode, the traveling of the vehicle is controlled in conformity with a driver's operation (a steering operation, a braking operation, and an accelerator operation), and the vehicle system does not autonomously perform the steering control, the brake control and the accelerator control. The driving mode of the vehicle is not a concept existing only in some vehicles but a concept existing in all vehicles including conventional vehicles having no autonomous driving function. For example, the driving mode of the vehicle is classified in accordance with a vehicle control method or the like.

Thus, it is expected that vehicles traveling in the autonomous driving mode (hereinafter, appropriately referred to as "autonomous driving vehicle") and vehicles traveling in the manual driving mode (hereinafter, appropriately referred to as "manual driving vehicle") coexist on public roads.

As an example of the autonomous driving technology, Patent Document 1 (Japanese Patent Application Laid-Open Publication No. H09-277887) discloses an autonomous follow-up traveling system in which a following vehicle can autonomously follow a preceding vehicle. In the autonomous follow-up traveling system, each of the preceding vehicle and the following vehicle has an illumination system, character information for preventing another vehicle from intruding between the preceding vehicle and the following vehicle is displayed on the illumination system of the preceding vehicle. And character information indicative of the autonomous follow-up traveling mode is displayed on the illumination system of the following vehicle.

In an autonomous driving society where the autonomous driving vehicles and the manual driving vehicle coexist, it is expected that inter-vehicle communication will be important so as for the vehicles to secure smooth traveling. In particular, when a message of one vehicle is visually presented to the other in another vehicle, the occupant in the other vehicle can feel relieved because the occupant can visually recognize an intention of the one vehicle.

Thus, it is thought in the upcoming autonomous driving society that the visual inter-vehicle communication is very useful so as to secure the smooth traveling of the vehicle.

The present disclosure is aimed at providing an inter-vehicle communication system, a vehicle system, a vehicle illumination system and a vehicle that enable rich visual communication between vehicles.

SUMMARY OF INVENTION

An inter-vehicle communication system relating to one aspect of the present disclosure includes: a first vehicle including a message generator configured to generate a message and a first wireless communication unit configured to wirelessly transmit the generated message; a second vehicle including a second wireless communication unit configured to receive the message transmitted from the first vehicle; and a display device that is located in the second vehicle and is configured to display the message.

A vehicle system relating to one aspect of the present disclosure is provided for a vehicle capable of traveling in an autonomous driving mode. The vehicle system includes: a message generator configured to generate a message that is to be displayed on a display device located in another vehicle outside the vehicle; and a wireless communication unit configured to wirelessly transmit the generated message.

A vehicle illumination system relating to one aspect of the present disclosure is provided for a vehicle capable of traveling in an autonomous driving mode. The vehicle illumination system includes: a third illumination unit configured to emit laser light toward an outside of the vehicle; and a third illumination controller configured to cause the third illumination unit to irradiate the laser light to a front glass of another vehicle outside the vehicle, thereby displaying a message on the front glass.

A vehicle relating to one aspect of the present disclosure includes a vehicle illumination system and is capable of traveling in an autonomous driving mode. The vehicle illumination system includes: a third illumination unit configured to emit laser light toward an outside of the vehicle; and a third illumination controller configured to cause the third illumination unit to irradiate the laser light to a front glass of another vehicle outside the vehicle, thereby displaying a message on the front glass.

It becomes possible to provide an inter-vehicle communication system, a vehicle system, a vehicle illumination system and a vehicle that enable rich visual communication between vehicles.

BRIEF DESCRIPTION OF DRAWINGS

Exemplary embodiments of the present invention will be described in detail based on the following figures, wherein.

DESCRIPTION OF EMBODIMENTS (First Embodiment)

Figure 1:
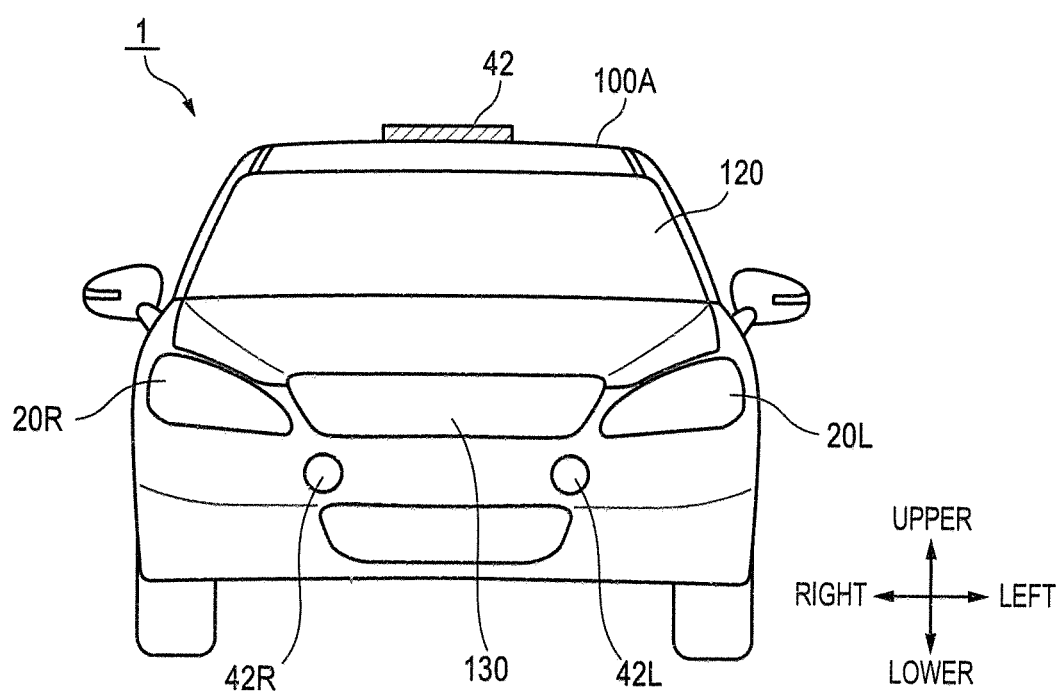
FIG. 1 is a front view of a vehicle having a vehicle system in accordance with a first embodiment of the present disclosure (hereinafter, simply referred to as 'first embodiment')

Hereinafter, a first embodiment of the present disclosure (hereinafter, referred to as 'first embodiment') will be described with reference to the drawings. For the sake of convenience of description, dimensions of the respective members shown in the drawings may be different from actual dimensions of the respective members.

Also, in the description of the first embodiment, for the sake of convenience of description, "the right and left direction", "the upper and lower direction" and "the front and rear direction" will be appropriately mentioned. The directions are relative directions set with respect to a vehicle 1 shown in FIG. 1. Here, "the right and left direction" is a direction including "the rightward direction" and "the leftward direction". "The upper and lower direction" is a direction including "the upward direction" and "the downward direction". "The front and rear direction" is a direction including "the forward direction" and "the rearward direction". Although not shown in FIG. 1, the front and rear direction is a direction perpendicular to the right and left direction and the upper and lower direction.

Figure 2:
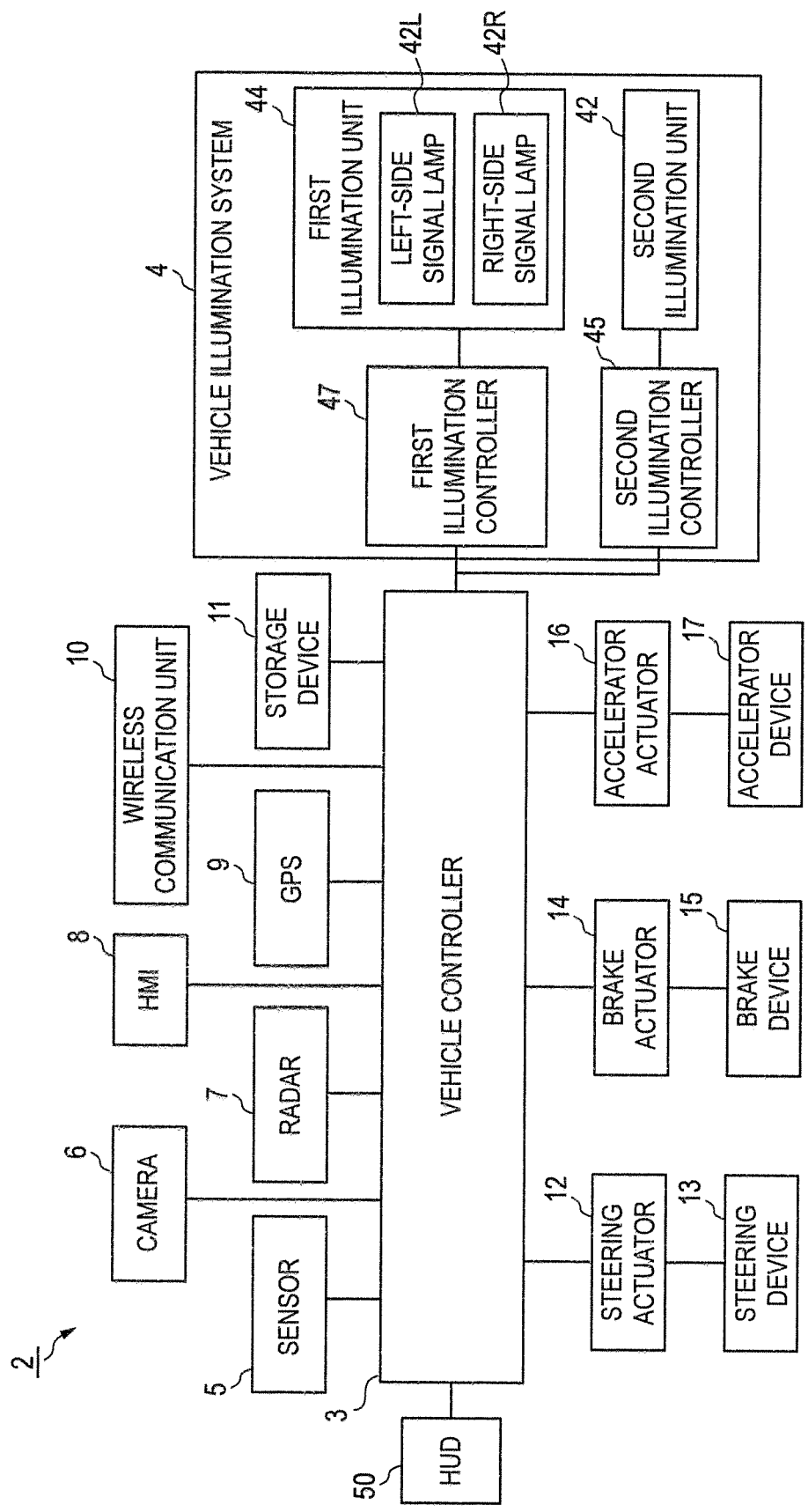
FIG. 2 is a block diagram depicting the vehicle system of the first embodiment.

First, a vehicle system 2 of the first embodiment is described with reference to FIGS. 1 and 2. FIG. 1 is a front view of the vehicle 1 having the vehicle system 2 mounted thereto. FIG. 2 is a block diagram depicting the vehicle system 2. The vehicle 1 is a vehicle (automobile) capable of traveling in an autonomous driving mode.

As shown in FIG. 2, the vehicle system 2 includes a vehicle controller 3, a vehicle illumination system 4 (hereinafter, simply referred to as "the illumination system 4"), a head-up display (HUD) 50, a sensor 5, a camera 6, and a radar 7. Also, the vehicle system 2 includes an HMI (Human Machine Interface) 8, a GPS (Global Positioning System) 9, a wireless communication unit 10, and a storage device 11. In addition, the vehicle system 2 includes a steering actuator 12, a steering device 13, a brake actuator 14, a brake device 15, an accelerator actuator 16, and an accelerator device 17.

The vehicle controller 3 is configured to control traveling of the vehicle 1. The vehicle controller 3 is configured by, for example, at least one an electronic control unit (ECU). The electronic control unit includes a computer system (for example, SoC (System on a Chip) and the like) having one or more processors and one or more memories, and an electronic circuit having an active element such as a transistor and a passive element. The processor is, for example, a CPU (Central Processing Unit), an MPU (Micro Processing Unit), a GPU (Graphics Processing Unit) and/or a TPU (Tensor Processing Unit). The CPU may be configured by a plurality of CPU cores. The GPU may be configured by a plurality of GPU cores. The memory includes a ROM (Read Only Memory) and a RAM (Random Access Memory). In the ROM, a vehicle control program may be stored. For example, the vehicle control program may include an artificial intelligence (AI) program for autonomous driving. The AI program is a program established by a supervised or unsupervised machine learning (particularly, deep learning) using a multi-layered neural network. In the RAM, the vehicle control program, vehicle control data and/or surrounding environment information indicative of a surrounding environment of the vehicle may be temporarily stored. The processor may be configured to develop, on the RAM, a program designated from the diverse vehicle control programs stored in the ROM and to execute a variety of processes in cooperation with the RAM. Also, the computer system may be configured by a non-Neumann type computer such as an ASIC (Application Specific Integrated Circuit), an FPGA (Field-Programmable Gate Array) and the like. Also, the computer system may be configured by a combination of a Neumann type computer and a non-Neumann type computer.

The illumination system 4 includes a first illumination unit 44, a first illumination controller 47, a second illumination unit 42, and a second illumination controller 45. The first illumination unit 44 is a lamp for supporting visual communication between a target object such as a pedestrian, other vehicle and the like and the vehicle 1, and is configured to emit light toward an outside of the vehicle 1. The first illumination unit 44 includes a left-side signal lamp 42L, and a right-side signal lamp 42R. In below descriptions, the left-side signal lamp 42L and the right-side signal lamp 42R may be simply referred to as 'signal lamps 42L, 42R'.

For example, the signal lamps 42L, 42R may be blinked when giving way to the pedestrian. In this case, the pedestrian can recognize that the vehicle 1 is to give way to the pedestrian by seeing the blinking of the signal lamps 42L, 42R. Each of the signal lamps 42L, 42R may include one or more light-emitting elements such as an LED (Light Emitting Diode), an LD (Laser Diode) and the like, and an optical member such as a lens. As shown in FIG. 1, the signal lamps 42L, 42R are arranged below a grill 130. In particular, the signal lamps 42L, 42R may be arranged symmetrically with respect to a central line of the vehicle 1. Also, illumination colors of the signal lamps 42L, 42R are, for example, yellow (selective yellow) or white. In the meantime, the illumination colors, arrangement places and shapes of the signal lamps 42L, 42R are not particularly limited.

The first illumination controller 47 is configured to control drives of the signal lamps 42L, 42R. For example, when the vehicle controller 3 wirelessly transmits a message to the other vehicle via the wireless communication unit 10, the first illumination controller 47 changes an illumination feature (turning on or off, a blinking cycle, an illumination color, a luminosity or the like) of the first illumination unit 44 (signal lamps 42L, 42R), which is visually recognized. The first illumination controller 47 is configured by an electronic control unit (ECU) and is electrically connected to a power supply (not shown). The electronic control unit includes a computer system (for example, SoC and the like) having one or more processors and one or more memories, and an analog processing circuit having an active element such as a transistor and a passive element. The processor is, for example, a CPU, an MPU, a GPU and/or a TPU. The memory includes a ROM and a RAM. Also, the computer system may be configured by a non-Neumann type computer such as an ASIC, an FPGA and the like. The analog processing circuit includes a lamp drive circuit (for example, an LED driver and the like) configured to control drives of the signal lamps 42L, 42R. In the first embodiment, the vehicle controller 3 and the first illumination controller 47 are provided as separate configurations. However, the vehicle controller 3 and the first illumination controller 47 may be integrally configured. In this respect, the first illumination controller 47 and the vehicle controller 3 may be configured by a single electronic control unit.

Figure 7:
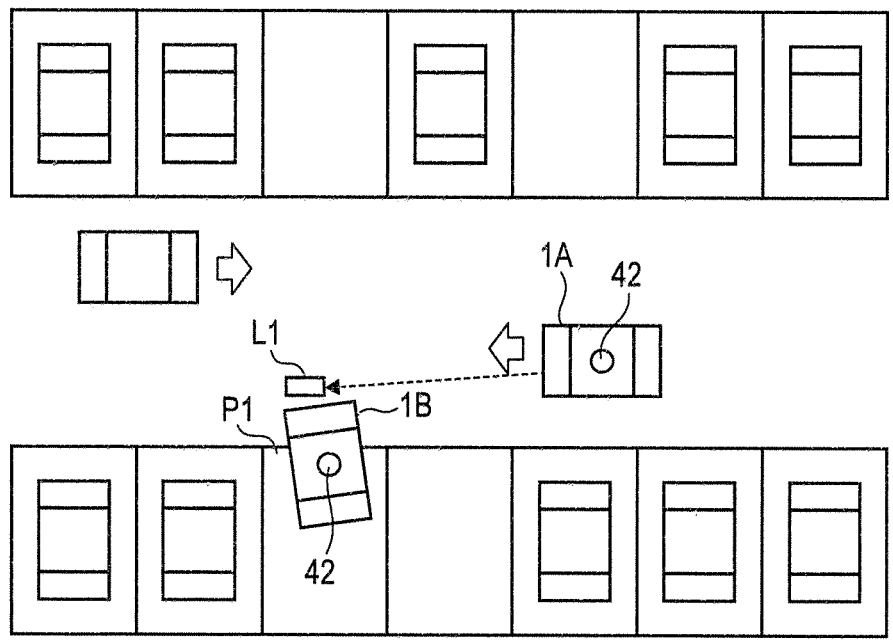
FIG. 7 depicts an aspect where the transmission-side vehicle emits a light pattern toward the receiving-side vehicle.

The second illumination unit 42 includes a laser light source configured to emit laser light, a light deflection device configured to deflect the laser light emitted from the laser light source, and an optical member such as a lens, for example. The laser light source is an RGB laser light source configured to emit red laser light, green laser light and blue laser light, respectively, for example. The light deflection device is a MEMS (Micro Electro Mechanical Systems) mirror, a galvano mirror, a polygon mirror and the like. The second illumination unit 42 is configured to draw a light pattern L1 (refer to FIG. 7) on a road surface by scanning the laser light. When the laser light source is the RGB laser light source, the second illumination unit 42 can draw a light pattern of diverse colors on the road surface.

In the meantime, in the first embodiment, as shown in FIG. 1, the single second illumination unit 42 is arranged on a vehicle body roof 100A. However, the number, arrangement, shape and the like of the second illumination unit 42 are not particularly limited inasmuch as the second illumination unit 42 can draw the light pattern on the road surface. For example, when the two second illumination units 42 are provided, one of the two second illumination units 42 may be mounted in the left-side headlamp 20L and the other may be mounted in the right-side headlamp 20R. Also, when the four second illumination units 42 are provided, the second illumination unit 42 may be respectively mounted in the left-side headlamp 20L, the right-side headlamp 20R, a left-side rear combination lamp (not shown) and a right-side rear combination lamp (not shown).

Also, a drawing manner of the second illumination unit 42 may be a DLP (Digital Light Processing) manner or an LCOS (Liquid Crystal on Silicon) manner. In this case, an LED is used as the light source, instead of the laser.

The second illumination controller 45 is configured to control drive of the second illumination unit 42. For example, when the vehicle controller 3 wirelessly transmits a message to the other vehicle via the wireless communication unit 10, the second illumination controller 45 controls the second illumination unit 42 so that a predetermined light pattern (for example, the light pattern L1) is to be presented toward the other vehicle. The second illumination controller 45 is configured by an electronic control unit (ECU). The electronic control unit includes a computer system (for example, SoC and the like) having one or more processors and one or more memories, a laser light source control circuit (analog processing circuit) configured to control drive of the laser light source of the second illumination unit 42, and a light deflection device control circuit (analog processing circuit) configured to control drive of the light deflection device of the second illumination unit 42. The processor is, for example, a CPU, an MPU, a GPU and/or a TPU. The memory includes a ROM and a RAM. Also, the computer system may be configured by a non-Neumann type computer such as an ASIC, an FPGA and the like. In the first embodiment, the vehicle controller 3 and the second illumination controller 45 are provided as separate configurations. However, the vehicle controller 3 and the second illumination controller 45 may be integrally configured. In this respect, the second illumination controller 45 and the vehicle controller 3 may be configured by a single electronic control unit. Also, the first illumination controller 47 and the second illumination controller 45 may be integrally configured.

For example, the computer system of the second illumination controller 45 is configured to specify a light pattern to be irradiated to the outside of the vehicle 1, based on an instruction signal transmitted from the vehicle controller 3, and to transmit a signal indicative of the specified light pattern to the laser light source control circuit and the light deflection device control circuit. The laser light source control circuit is configured to generate a control signal for controlling the drive of the laser light source, based on the signal indicative of the light pattern, and to transmit the generated control signal to the laser light source of the second illumination unit 42. In the meantime, the light deflection device control circuit is configured to generate a control signal for controlling the drive of the light deflection device, based on the signal indicative of the light pattern, and to transmit the generated control signal to the light deflection device of the second illumination unit 42. In this way, the second illumination controller 45 can control the drive of the second illumination unit 42.

Figure 6:
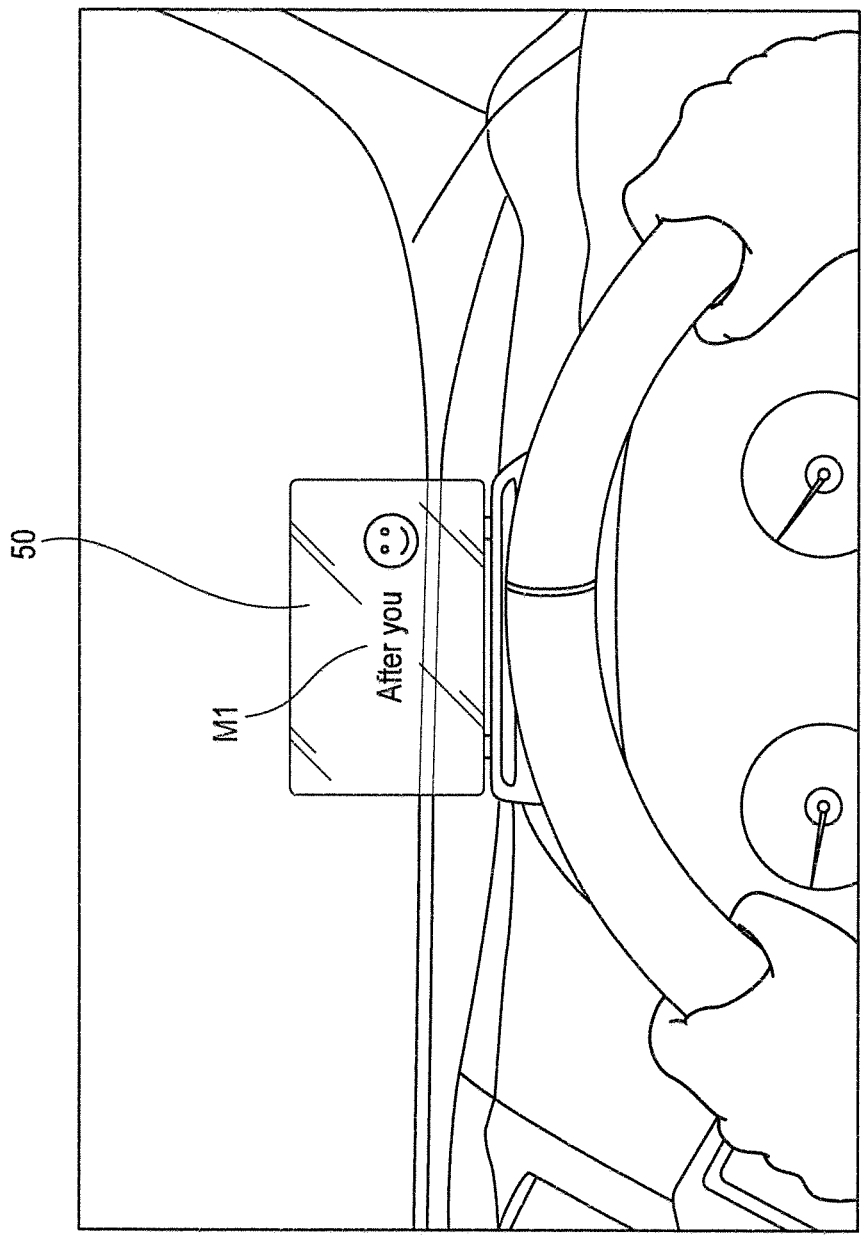
FIG. 6 depicts an example of a head-up display (HUD) mounted on a dashboard of the receiving-side vehicle.

The HUD 50 (an example of the display device) is mounted at a predetermined place in the vehicle 1. For example, as shown in FIG. 6, the HUD 50 is mounted on a dashboard of the vehicle 1. In the meantime, the mounting place of the HUD 50 is not particularly limited. The HUD 50 is configured to function as an interface between the vehicle 1 and an occupant. In particular, the HUD 50 is configured to visually present information about driving of the vehicle 1 (for example, information about the autonomous driving) to the occupant. For example, the HUD 50 is configured to display information obtained by inter-vehicle communication between the vehicle 1 and the other vehicle and/or road-to-vehicle communication between the vehicle 1 and the infrastructure equipment (a traffic light and the like). In this respect, the HUD 50 is configured to display a message transmitted from the other vehicle and/or the infrastructure equipment. The occupant in the vehicle 1 can perceive an intention and the like of the other vehicle by seeing the message displayed on the HUD 50. Also, the information displayed by the HUD 50 is visually presented to the occupant in the vehicle 1 with being superimposed in a real space ahead of the vehicle 1. In this way, the HUD 50 is configured to function as an AR (Augmented Reality) display.

The HUD 50 includes an image generation unit, a transparent screen on which an image generated by the image generation unit is to be displayed, and an image generation controller configured to control the image generation unit. When a drawing manner of the HUD 50 is a laser projector manner, the image generation unit includes a laser light source configured to emit laser light, a light deflection device configured to deflect the laser light emitted from the laser light source, and an optical member such as a lens. The laser light source is an RGB laser light source configured to emit red laser light, green laser light and blue laser light, respectively, for example. The light deflection device is for example, a MEMS mirror. In the meantime, the drawing manner of the HUD 50 may be a DLP (Digital Light Processing) manner or an LCOS (Liquid Crystal on Silicon) manner. In this case, an LED is used as the light source, instead of the laser.

Also, the HUD 50 may not include the transparent screen. In this case, an image generated by the image generation unit may be displayed on a front glass 120 of the vehicle 1. The image generation controller includes a computer system (a microcomputer or the like) having one or more processors and one or more memories, and an analog processing circuit, for example. The analog processing circuit includes a laser light source control circuit configured to control drive of the laser light source, and a light deflection device control circuit configured to control drive of the light deflection device, for example.

Also, the HUD 50 may be communicatively connected to the vehicle controller 3 via a wired cable. When the HUD 50 has a wireless communication function, the HUD 50 may be communicatively connected to the vehicle controller 3 via the wireless communication unit 10. Also, the HUD 50 may be communicatively connected directly to the other vehicle, the infrastructure equipment and the like without via the wireless communication unit 10.

The sensor 5 includes an acceleration sensor, a speed sensor, a gyro sensor, and the like. The sensor 5 is configured to detect a traveling condition of the vehicle 1 and to output traveling condition information to the vehicle controller 3. The sensor 5 may further include a seating sensor configured to detect whether a driver is sitting on a driver seat, a face direction sensor configured to detect a direction of a driver's face, an external weather sensor configured to detect an external weather condition, an occupant detection sensor configured to detect whether there is an occupant in a vehicle, and the like.

The camera 6 is, for example, a camera including an imaging device such as a CCD (Charge-Coupled Device) and a CMOS (complementary MOS). The camera 6 is configured to acquire image data indicative of a surrounding environment of the vehicle 1 and to transmit the image data to the vehicle controller 3. The vehicle controller 3 is configured to acquire the surrounding environment information, based on the transmitted image data. Here, the surrounding environment information may include information about a target object (a pedestrian, the other vehicle, a marker and the like) existing at the outside of the vehicle 1. For example, the surrounding environment information may include information about attributes of the target object existing at the outside of the vehicle 1, and information about a distance and a position of the target object relative to the vehicle 1. The camera 6 may be configured as a monocular camera or a stereo camera.

The radar 7 is a millimeter wave radar, a microwave radar and/or a laser radar (for example, LiDAR). For example, the LiDAR unit is configured to detect the surrounding environment of the vehicle 1. In particular, the LiDAR unit is configured to acquire 3D mapping data (point group data) indicative of the surrounding environment of the vehicle 1 and to transmit the 3D mapping data to the vehicle controller 3. The vehicle controller 3 is configured to specify the surrounding environment information, based on the transmitted 3D mapping data.

The HMI 8 includes an input unit configured to receive an input operation from a driver and an output unit configured to output the traveling information and the like toward the driver. The input unit includes a steering wheel, an accelerator pedal, a brake pedal, a driving mode changeover switch for switching the driving mode of the vehicle 1, and the like. The GPS 9 is configured to acquire current position information of the vehicle 1 and to output the acquired current position information to the vehicle controller 3. The current position information includes GPS coordinates (latitude and longitude) of the vehicle 1.

The wireless communication unit 10 is configured to receive information (for example, traveling information, and the like) relating to other vehicles around the vehicle 1 from the other vehicles and to transmit information (for example, traveling information, and the like) relating to the vehicle 1 to the other vehicles (inter-vehicle communication). Also, the wireless communication unit 10 is configured to receive infrastructure information from the infrastructure equipment such as a traffic light, a marker lamp and the like and to transmit the traveling information of the vehicle 1 to the infrastructure equipment (road-to-vehicle communication). Also, the wireless communication unit 10 is configured to receive information relating to a pedestrian from a portable electronic device (a smart phone, a tablet, a wearable device, and the like) carried by the pedestrian and to transmit the host vehicle traveling information of the vehicle 1 to the portable electronic device (pedestrian-to-vehicle communication). The vehicle 1 may be configured to perform communication with the other vehicle, the infrastructure equipment or the portable electronic device by an ad hook mode directly or via an access point. Also, the vehicle 1 may be configured to perform communication with the other vehicle, the infrastructure equipment or the portable electronic device via a communication network 200 (refer to FIG. 5) such as the Internet. The wireless communication standards include, for example, Wi-Fi (registered trademark), Bluetooth (registered trademark), ZigBee (registered trademark), LPWA, DSRC (registered trademark) or Li-Fi. Also, the vehicle 1 may be configured to perform communication with the other vehicle, the infrastructure equipment or the portable electronic device via a fifth generation (5G) mobile communication system.

The storage device 11 is an external storage device such as a hard disc drive (HDD), an SSD (Solid State Drive) and the like. In the storage device 11, the 2D or 3D map information and/or the vehicle control program may be stored. For example, the 3D map information may be configured by the point group data. The storage device 11 is configured to output the map information and the vehicle control program to the vehicle controller 3, in response to a request from the vehicle controller 3. The map information and the vehicle control program may be updated via the wireless communication unit 10 and the communication network 200 such as the Internet.

When the vehicle 1 travels in an autonomous driving mode, the vehicle controller 3 autonomously generates at least one of a steering control signal, an accelerator control signal and a brake control signal, based on the traveling condition information, the surrounding environment information, the current position information, the map information and the like. The steering actuator 12 is configured to receive the steering control signal from the vehicle controller 3 and to control the steering device 13 on the basis of the received steering control signal. The brake actuator 14 is configured to receive the brake control signal from the vehicle controller 3 and to control the brake device 15 on the basis of the received brake control signal. The accelerator actuator 16 is configured to receive the accelerator control signal from the vehicle controller 3 and to control the accelerator device 17 on the basis of the received accelerator control signal. In this way, the vehicle controller 3 autonomously controls the traveling of the vehicle 1, based on the traveling condition information, the surrounding environment information, the current position information, the map information and the like. That is, in the autonomous driving mode, the traveling of the vehicle 1 is autonomously controlled by the vehicle system 2.

On the other hand, when the vehicle 1 travels in a manual driving mode, the vehicle controller 3 generates a steering control signal, an accelerator control signal and a brake control signal in conformity with a driver's manual operation on the accelerator pedal, the brake pedal and the steering wheel. In this way, in the manual driving mode, the steering control signal, the accelerator control signal and the brake control signal are generated by the driver's manual operation, so that the traveling of the vehicle 1 is controlled by the driver.

Subsequently, the driving mode of the vehicle 1 is described. The driving mode includes an autonomous driving mode and a manual driving mode. The autonomous driving mode includes a fully autonomous driving mode, an advanced driving support mode, and a driving support mode. In the fully autonomous driving mode, the vehicle system 2 is configured to autonomously perform all of the traveling controls of the steering control, the brake control and the accelerator control, and the driver is not in a state where it is possible to drive the vehicle 1. In the advanced driving support mode, the vehicle system 2 is configured to autonomously perform all of the traveling controls of the steering control, the brake control and the accelerator control, and the driver does not drive the vehicle 1 although the driver is in a state where it is possible to drive the vehicle 1. In the driving support mode, the vehicle system 2 is configured to autonomously perform a part of the traveling controls of the steering control, the brake control and the accelerator control, and the driver drives the vehicle 1 under the driving support of the vehicle system 2. On the other hand, in the manual driving mode, the vehicle system 2 is configured not to autonomously perform the traveling controls, and the driver drives the vehicle 1 without the driving support of the vehicle system 2.

Also, the driving mode of the vehicle 1 may be switched by operating a driving mode changeover switch. In this case, the vehicle controller 3 is configured to switch the driving mode of the vehicle 1 among the four driving modes (the fully autonomous driving mode, the advanced driving support mode, the driving support mode, and the manual driving mode) in accordance with a driver's operation on the driving mode changeover switch. Also, the driving mode of the vehicle 1 may be autonomously switched on the basis of information relating to a travel-allowed section where traveling of an autonomous driving vehicle is allowed or a travel-prohibited section where the traveling of the autonomous driving vehicle is prohibited or information relating to the external weather condition. In this case, the vehicle controller 3 is configured to switch the driving mode of the vehicle 1, based on such information. Also, the driving mode of the vehicle 1 may be autonomously switched by using a seating sensor, a face direction sensor, or the like. In this case, the vehicle controller 3 is configured to switch the driving mode of the vehicle 1, based on an output signal from the seating sensor or the face direction sensor.

Figure 3:
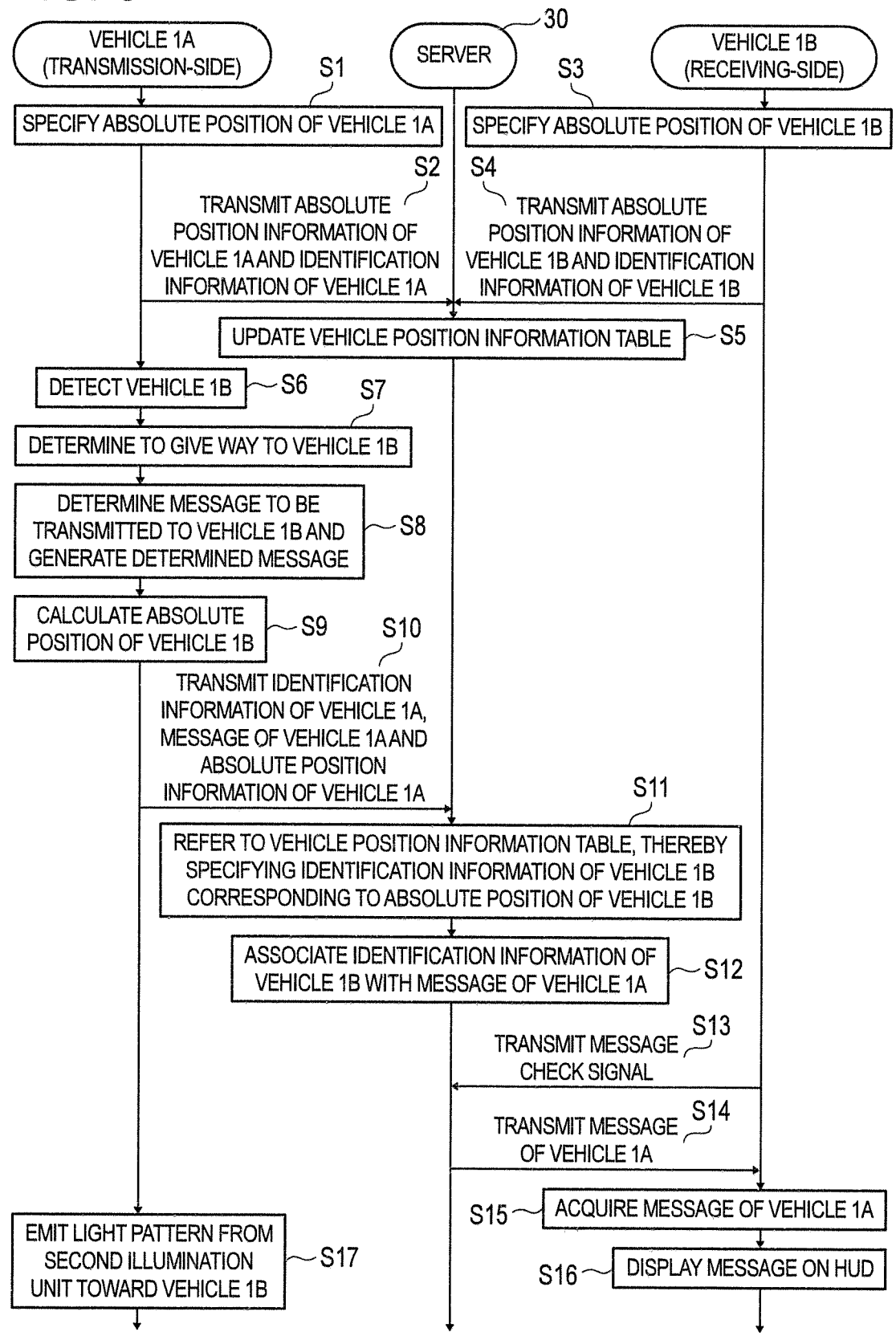
FIG. 3 is a sequence diagram for illustrating an example of operations of an inter-vehicle communication system of the first embodiment.
Figure 4:
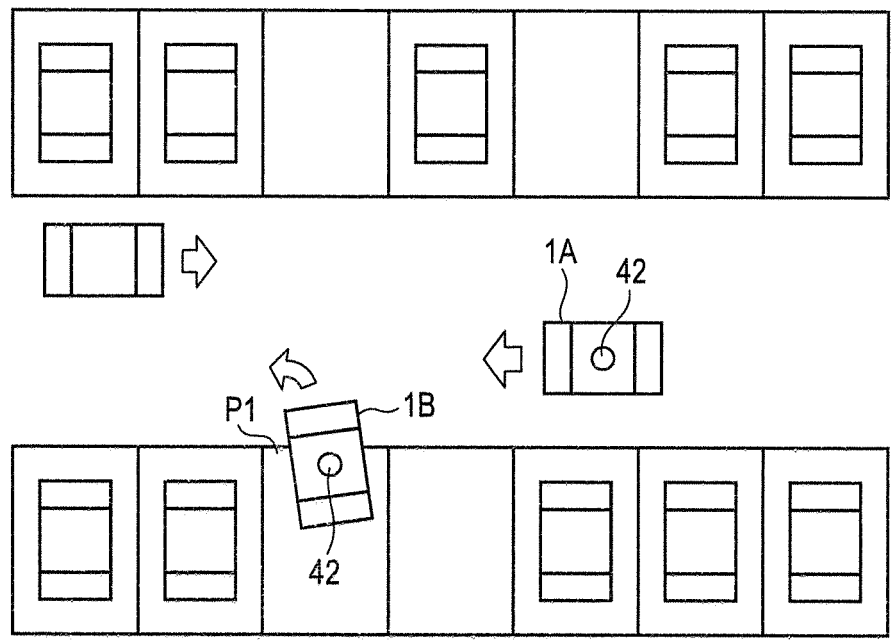
FIG. 4 depicts a transmission-side vehicle and a receiving-side vehicle in a parking lot.
Figure 5:
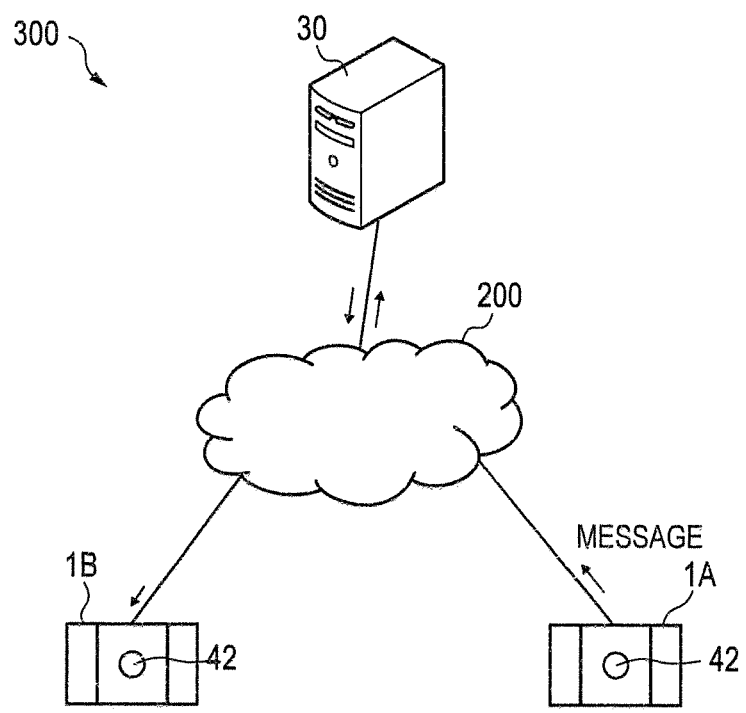
FIG. 5 is an outline view depicting the inter-vehicle communication system configured by the transmission-side vehicle, the receiving-side vehicle and a server.

An example of operations of an inter-vehicle communication system 300 (refer to FIG. 5) in accordance with the first embodiment is described with reference to FIGS. 3 to 5. FIG. 3 is a sequence diagram for illustrating an example of operations of the inter-vehicle communication system 300 of the first embodiment. FIG. 4 depicts a vehicle 1A (transmission-side vehicle) and a vehicle 1B (receiving-side vehicle) in a parking lot. FIG. 5 is an outline view depicting the inter-vehicle communication system 300 configured by the vehicle 1A, the vehicle 1B and a server 30 on the communication network 200 such as the Internet.

The inter-vehicle communication system 300 of the first embodiment is configured by the vehicle 1A, which is a transmission-side vehicle configured to transmit a message, the vehicle 1B, which is a receiving-side vehicle configured to receive the message, and the server 30 configured to manage the message transmitted from each vehicle. The vehicle 1A, the vehicle 1B and the server 30 are communicatively connected each other via the communication network 200. Also, it is assumed that each of the vehicles 1A, 1B has the vehicle system 2 shown in FIG. 2. Therefore, in below descriptions, the constitutional elements (for example, the vehicle controller 3) of the vehicle system 2 shown in FIG. 2 will be appropriately mentioned. In the meantime, in the first embodiment, the communication (inter-vehicle communication) between the vehicle 1A and the vehicle 1B is performed via the server 30. However, the inter-vehicle communication system 300 of the first embodiment is not limited thereto. For example, the communication between the vehicle 1A and the vehicle 1B may be directly performed without via the server 30.

As shown in FIG. 3, in step S1, the vehicle controller 3 of the vehicle 1A (an example of the first vehicle) specifies an absolute position (GPS coordinate) of the vehicle 1A via the GPS 9. Then, in step S2, the vehicle controller 3 of the vehicle 1A transmits absolute position information indicative of the absolute position of the vehicle 1A and identification information of the vehicle 1A to the server 30 via the wireless communication unit 10 (an example of the first wireless communication unit).

In the meantime, in step S3, the vehicle controller 3 of the vehicle 1B (an example of the second vehicle) specifies an absolute position (GPS coordinate) of the vehicle 1B via the GPS 9. Then, in step S4, the vehicle controller 3 of the vehicle 1B transmits absolute position information indicative of the absolute position of the vehicle 1B and identification information of the vehicle 1B to the server 30 via the wireless communication unit 10 (an example of the second wireless communication unit).

Then, the server 30 updates a vehicle position information table (database) on the basis of the absolute position information of the vehicles 1A, 1B and the identification information of the vehicles 1A, 1B (step S5). Here, the vehicle position information table includes the absolute position information (GPS coordinates) of a plurality of vehicles and the identification information of the plurality of vehicles. In the vehicle position information table, each of the absolute position information of the plurality of vehicles is associated with one of the identification information of the plurality of vehicles. The vehicle position information table is saved in a storage device (for example, an HDD, an SSD and the like) of the server 30. When the vehicle travels, the absolute position of the vehicle changes. Therefore, the vehicle position information table is necessarily updated all the time. For this reason, the processing from step S1 to S5 may be repetitively executed with a predetermined period.

Then, in step S6, the vehicle controller 3 of the vehicle 1A detects the vehicle 1B that exists ahead of the vehicle 1A and is about to go out of a parking section Pl. In particular, the vehicle controller 3 detects the vehicle 1B, based on the detection data acquired by the camera 6 and/or the radar 7. Then, in step S7, the vehicle controller 3 determines to give way to the vehicle 1B and to stop the vehicle 1A. Then, the vehicle controller 3 determines a message M1 to be transmitted to the vehicle 1B and generates the determined message M1 (step S8). In this way, the vehicle controller 3 functions as a message generator configured to generate a message. An example of the message MI to be transmitted to the vehicle 1B is a message "After you" (refer to FIG. 6).

Then, in step S9, the vehicle controller 3 calculates the absolute position (GPS coordinate) of the vehicle 1B. Specifically, the vehicle controller 3 specifies a relative position of the vehicle 1B to the vehicle 1A, based on the detection data acquired by the camera 6 and/or the radar 7. Then, the vehicle controller 3 calculates the absolute position (latitude and longitude) of the vehicle 1B, based on the specified relative position of the vehicle 1B and the absolute position information of the vehicle 1A. Then, in step S10, the vehicle controller 3 transmits the identification information of the vehicle 1A, the message M1 of the vehicle 1A and the absolute position information indicative of the calculated absolute position of the vehicle 1B to the server 30 via the wireless communication unit 10.

Then, the server 30 receives the identification information of the vehicle 1A, the message M1 of the vehicle 1A and the absolute position information of the vehicle 1B and then refers to the vehicle position information table, thereby specifying the identification information of the vehicle 1B corresponding to the absolute position of the vehicle 1B (step S11). Thereafter, the server 30 saves the message M1 in the storage device of the server 30 with the specified identification information of the vehicle 1B and the message M1 of the vehicle 1A being associated with each other (step S12). In this way, the server 30 can specify the vehicle 1B, which is a transmission destination of the message M1, by referring to the vehicle position information table.

Then, in step S13, the vehicle controller 3 of the vehicle 1 B transmits a message check signal and the identification information of the vehicle 1B to the server 30 so as to check the message transmitted to the vehicle 1B. The server 30 receives the message check signal and the identification information of the vehicle 1B, and then transmits the message M1 of the vehicle 1A associated with the vehicle 1B to the vehicle 1B (step S14). Thereafter, the vehicle controller 3 of the vehicle 1B acquires the message M1 of the vehicle 1A (step S15). In the meantime, in the first embodiment, the vehicle 1B acquires the message M1 in a fetch manner but may acquire the message M1 in a push manner. Also, the processing of step S13 may be executed with a predetermined period.

Then, in step S16, the vehicle controller 3 displays the message M1 ("After you") on the HUD 50 (an example of the display device) (refer to FIG. 6). In the first embodiment, since the message M1 transmitted from the vehicle 1A is displayed on the HUD 50 equipped in the vehicle 1B, the occupant in the vehicle 1B can visually recognize an intention of the vehicle 1A that is to give way to the vehicle 1B. In this way, it is possible to provide the inter-vehicle communication system 300 and the vehicle system 2 that enable rich visual communication between the vehicles. In the meantime, in the first embodiment, the display device configured to display the message M1 is not limited to the HUD 50. For example, the message M1 of the vehicle 1A may be displayed on an AR glass worn by the occupant in the vehicle 1B. Also, the message M1 of the vehicle 1A may be displayed on the portable electronic device such as a smart phone carried by the occupant in the vehicle 1B. Also, the message M1 of the vehicle 1A may be displayed on a display unit of a car navigation system equipped in the vehicle 1B. Also in this case, the occupant in the vehicle 1B can visually recognize an intention of the vehicle 1A.

Then, in step S17, the second illumination controller 45 of the vehicle 1A emits a light pattern L1 (refer to FIG. 7) from the second illumination unit 42 toward the vehicle 1B. Specifically, the second illumination unit 42 of the vehicle 1 irradiates the laser light toward a road surface ahead of the vehicle 1B, thereby drawing the light pattern L1 on the road surface ahead of the vehicle 1B. In the first embodiment, the line-shaped light pattern L1 is drawn on the road surface. However, the shape of the light pattern is not limited thereto. For example, the light pattern may be a circular or rectangular light pattern, too.

Like this, according to the first embodiment, when the vehicle 1A wirelessly transmits the message M1 toward the vehicle 1B, the light pattern L1 is drawn on the road surface ahead of the vehicle 1B. Therefore, the occupant in the vehicle 1B can surely specify that the transmission source of the message M1 displayed on the HUD 50 is the vehicle 1A by seeing the light pattern L1 emitted from the second illumination unit 42 of the vehicle 1A. In the meantime, the light pattern L1 may be drawn on the road surface around the vehicle 1B or may be drawn on a part of a vehicle body of the vehicle 1B.

Also, in the first embodiment, the processing of step S17 is executed after the processing of step S16 starts. However, the first embodiment is not limited thereto. For example, the processing of step S17 may be executed before the processing of step S16 starts. In this respect, the processing of step S17 may be executed before the processing of step S10. That is, before the message M1 is wirelessly transmitted to the server 30, the second illumination unit 42 of the vehicle 1A may draw the light pattern L1 on the road surface ahead of the vehicle 1B.

Also, in the first embodiment, in step S17, instead of the configuration where the second illumination unit 42 emits the light pattern L1, the first illumination controller 47 may change the illumination feature (turning on or off, a blinking cycle, an illumination color, a luminosity or the like) of the first illumination unit 44 (signal lamps 42L, 42R), which is visually recognized. For example, the first illumination controller 47 may blink the signal lamps 42L, 42R under lighting or lights-out. Also in this case, the occupant in the vehicle 1B can surely specify that the transmission source of the message M1 displayed on the HUD 50 is the vehicle 1A by seeing the change in the illumination feature of the signal lamps 42L, 42R.

Also, in step S17, the second illumination unit 42 may emit the light pattern L1 and the first illumination controller 47 may change the illumination feature of the signal lamps 42L, 42R. In this case, the occupant in the vehicle 1B can more surely specify that the transmission source of the message M1 displayed on the HUD 50 is the vehicle 1A by seeing the light pattern L1 emitted from the second illumination unit and the change in the illumination feature of the signal lamps 42L, 42R.

(Second Embodiment)

Subsequently, a second embodiment of the present disclosure (hereinafter, simply referred to as 'second embodiment') is described with reference to the drawings. In the meantime, in the descriptions of the second embodiment, for the sake of convenience of descriptions, the descriptions of the members having the same reference numerals as the members already described in the first embodiment are omitted.

Figure 8:
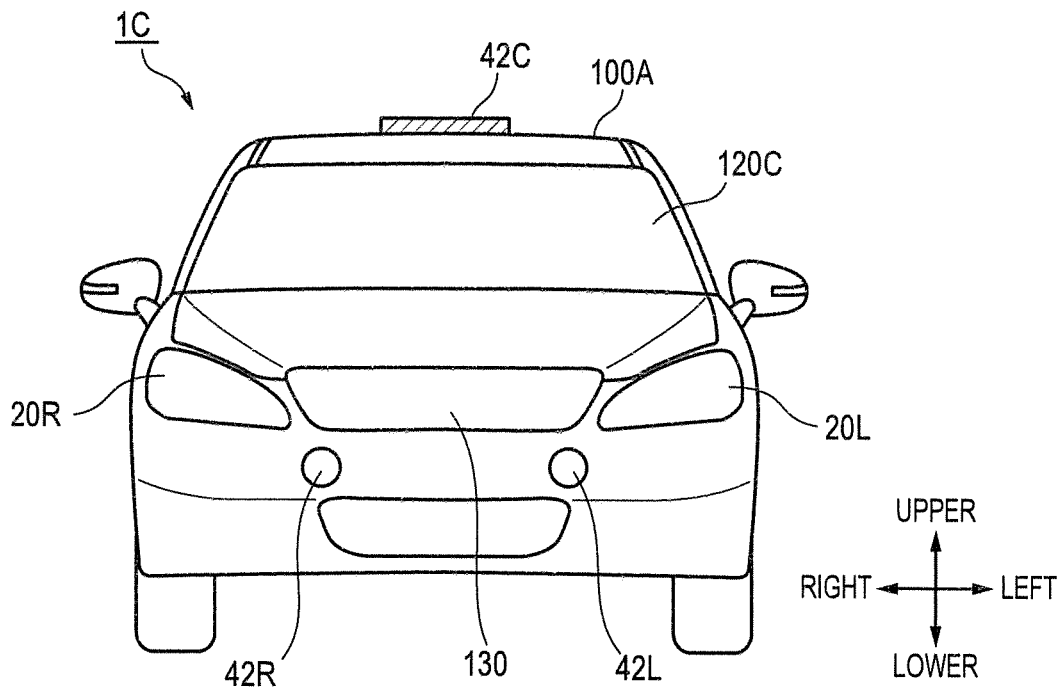
FIG. 8 is a front view of a vehicle having a vehicle system in accordance with a second embodiment of the present disclosure (hereinafter, simply referred to as 'second embodiment')
Figure 9:
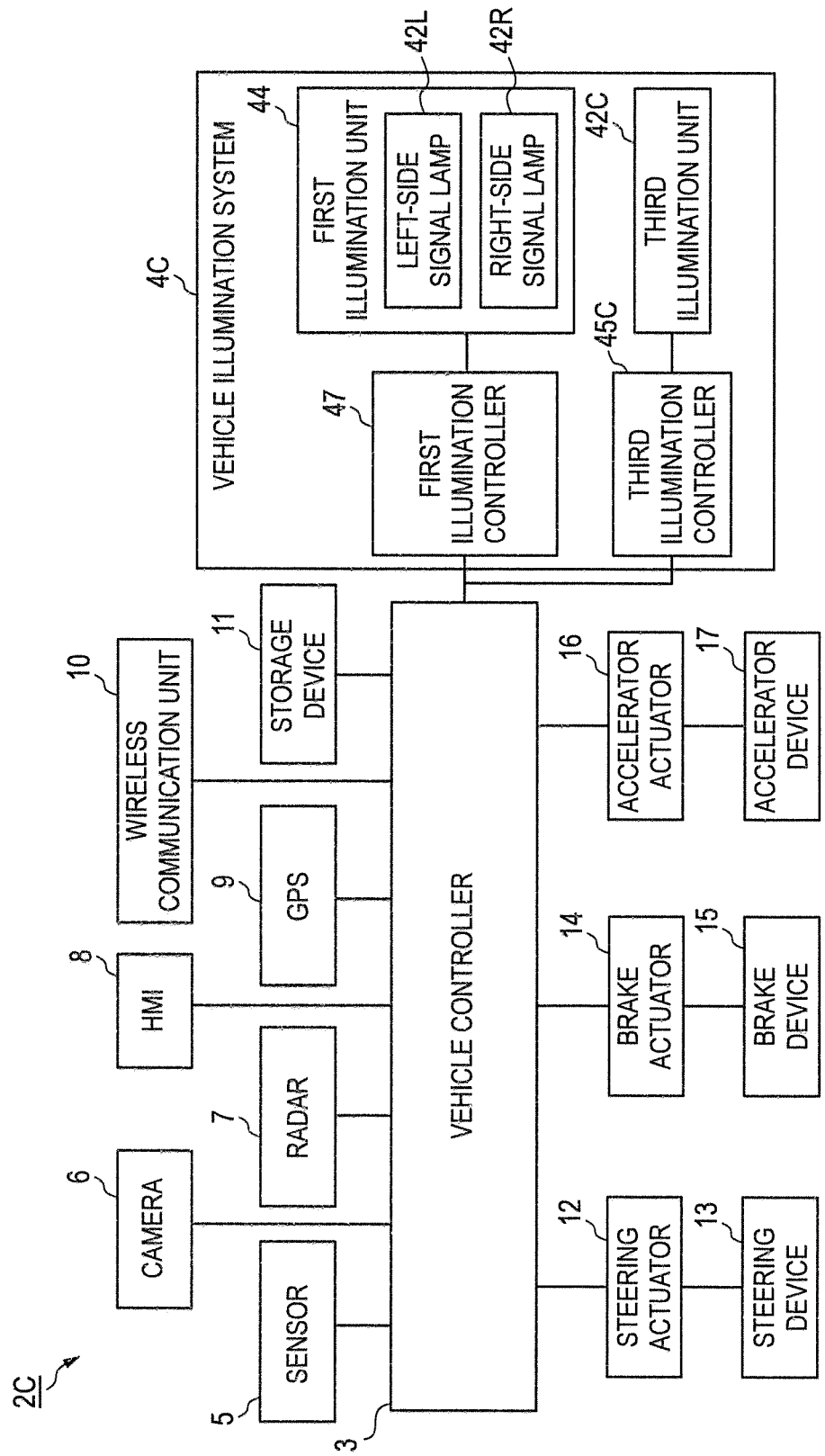
FIG. 9 is a block diagram depicting the vehicle system of the second embodiment.

First, a vehicle system 2C of the second embodiment is described with reference to FIGS. 8 and 9. FIG. 8 is a front view of a vehicle 1C having the vehicle system 2C in accordance with the second embodiment. FIG. 9 is a block diagram depicting the vehicle system 2C of the second embodiment. The vehicle system 2C is different from the vehicle system 2 of the first embodiment, in the following respect. That is, the vehicle system 2C is provided with a third illumination unit 42C and a third illumination controller 45C, instead of the second illumination unit 42 and the second illumination controller 45. Also, in the vehicle system 2C, the HUD 50 may not be mounted. In the below, only differences between the vehicle system 2C and the vehicle system 2 are described.

As shown in FIG. 9, a vehicle illumination system 4C (hereinafter, simply referred to as "illumination system 4C") includes the first illumination unit 44, the first illumination controller 47, the third illumination unit 42C, and the third illumination controller 45C. The third illumination unit 42C includes a laser light source configured to emit laser light, a light deflection device configured to deflect the laser light emitted from the laser light source, and an optical member such as a lens, for example. The laser light source is a laser light source configured to emit laser light of which a central wavelength λ is within a range of 350 nm to 410 nm, for example. The light deflection device is a MEMS (Micro Electro Mechanical Systems) mirror, a galvano mirror, a polygon mirror and the like, for example. The third illumination unit 42C is configured to irradiate the laser light on a front glass of the other vehicle outside the vehicle 1C, thereby displaying a message on the front glass. In the meantime, the third illumination unit 42C is arranged on the vehicle body roof 100A. However, the arrangement place of the third illumination unit 42C is not particularly limited.

The third illumination controller 45C is configured to control drive of the third illumination unit 42C. The third illumination controller 45C is configured by an electronic control unit (ECU). For example, the third illumination controller 45C may be configured by the same electronic control unit as the electronic control unit configuring the second illumination controller 45 of the first embodiment. In the second embodiment, the vehicle controller 3 and the third illumination controller 45C are provided as separate configurations. However, the vehicle controller 3 and the third illumination controller 45C may be integrally configured.

Also, a front glass 120C of the vehicle 1C of the second embodiment includes two glass plates and a light-emitting layer provided between the two glass plates. The laser light (of which the central wavelength λ is within the range of 350 nm to 410 nm) emitted from the other vehicle is irradiated to the front glass 120C of the vehicle 1C, so that the light-emitting layer of the front glass 120C emits the light. In this way, the laser light is scanned on the front glass 120C, so that a predetermined message (refer to FIG. 12) is displayed on the front glass 120C. For example, when the light-emitting layer of the front glass 120C emits green light, a color of the message to be displayed on the front glass 120C is green.

Figure 10:
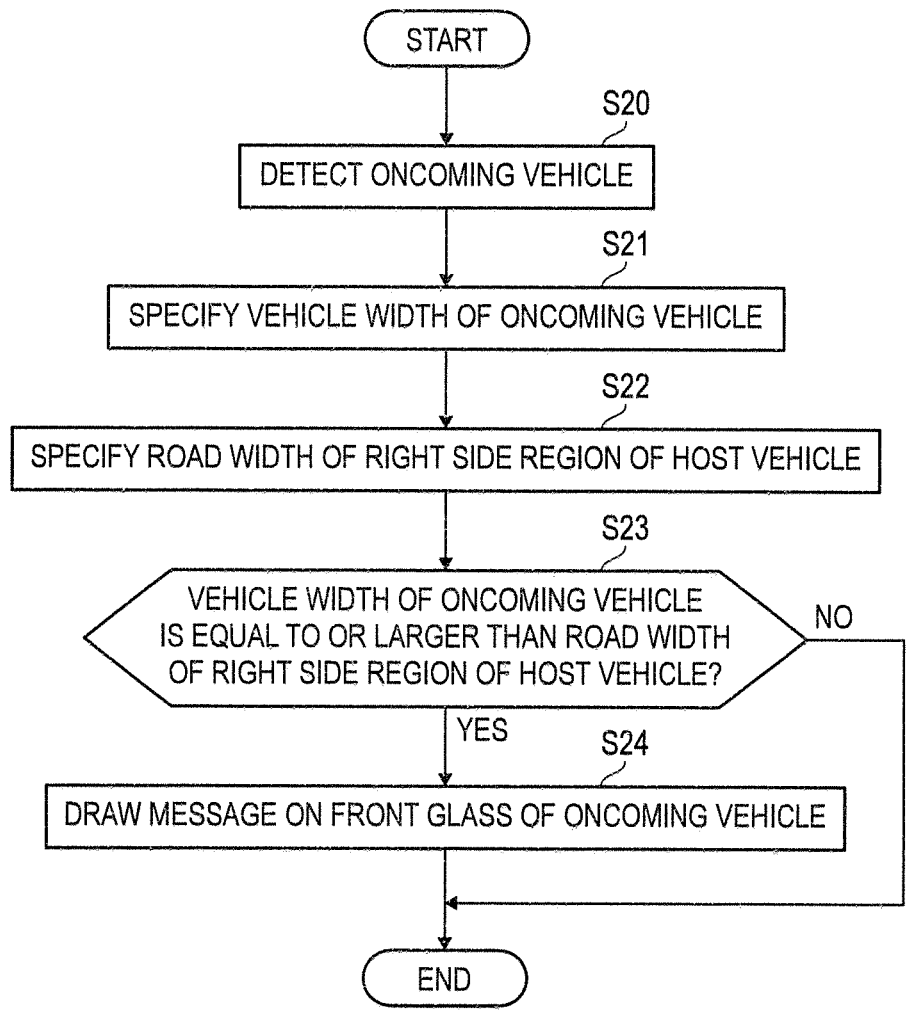
FIG. 10 is a flowchart for illustrating an example of operations of the vehicle system of the second embodiment.
Figure 11:
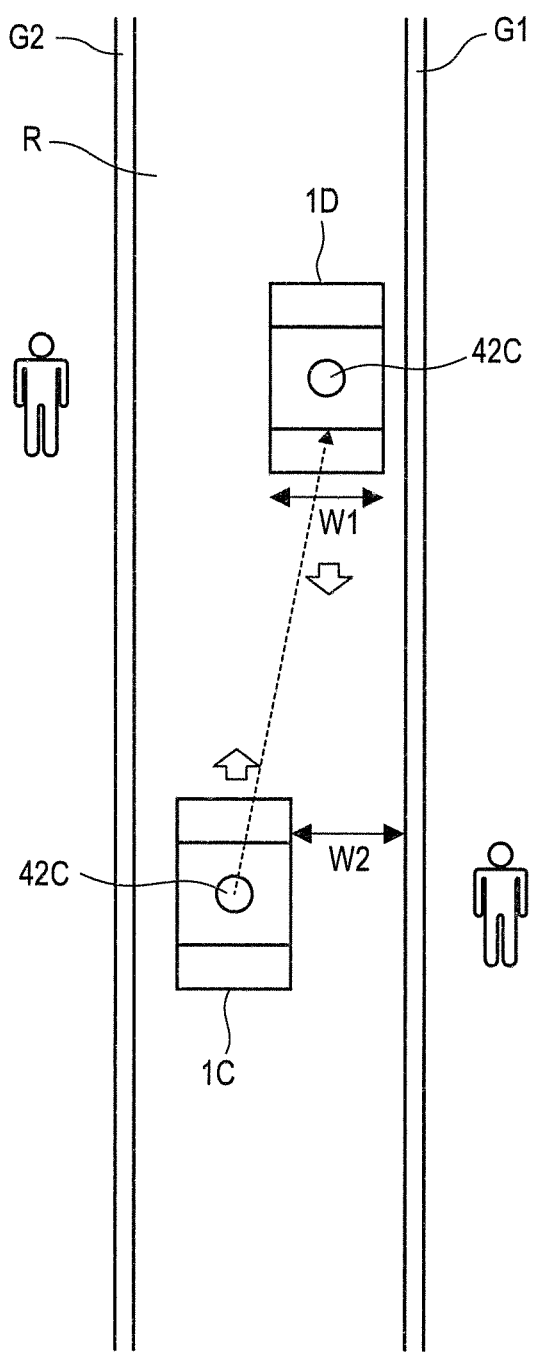
FIG. 11 depicts an aspect where one of two vehicles traveling on a narrow road emits laser light toward the other vehicle.
Figure 12:
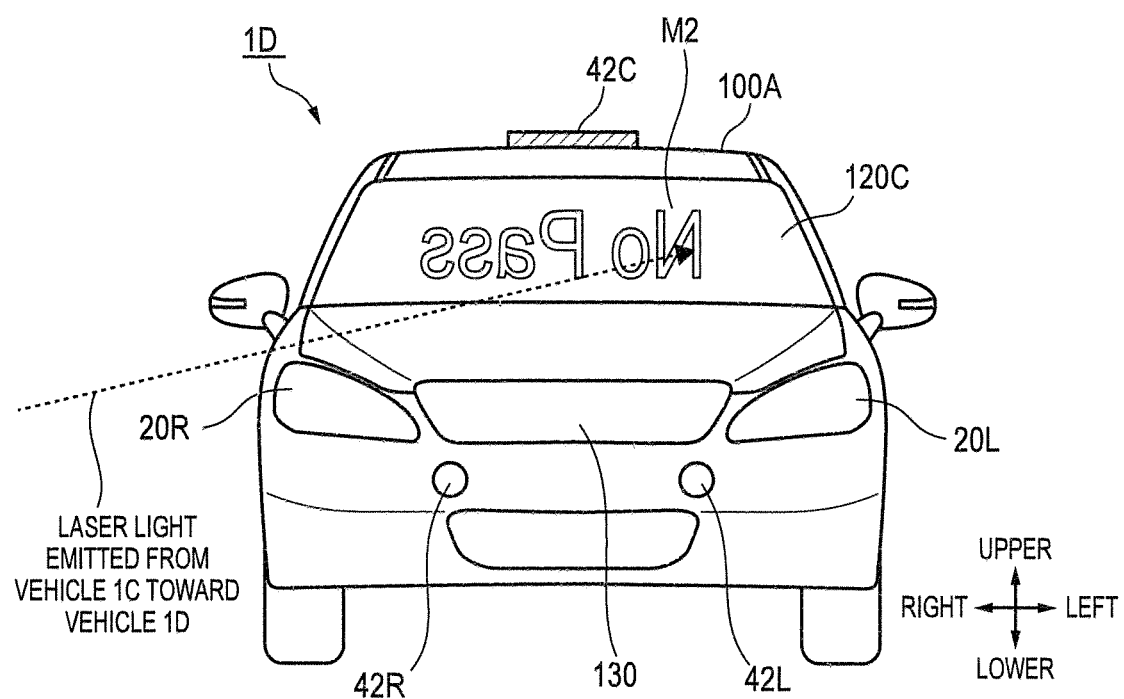
FIG. 12 depicts an aspect where a message is displayed on a front glass of the other vehicle by the laser light emitted from one vehicle.

Subsequently, an example of operations of the vehicle system 2C of the second embodiment is described with reference to FIGS. 10 to 12. FIG. 10 is a flowchart for illustrating an example of operations of the vehicle system 2C. FIG. 11 depicts an aspect where one vehicle 1C of two vehicles 1C, 1D traveling on a narrow road R emits laser light toward the other vehicle 1D. FIG. 12 depicts an aspect where a message M2 is displayed on the front glass 120C of the other vehicle 1D by the laser light emitted from the vehicle 1C. In below descriptions, it is assumed that the vehicle 1D has the same configuration as the vehicle 1C.

As shown in FIG. 10, the vehicle controller 3 of the vehicle 1C first detects an oncoming vehicle (vehicle 1D) existing in a region ahead of the vehicle 1C, based on the image data acquired from the camera 6 and/or the detection data acquired from the radar 7 (step S20). Then, in step S21, the vehicle controller 3 specifies a vehicle width w1 of the vehicle 1D (refer to FIG. 11), based on the image data acquired from the camera 6 and/or the detection data acquired from the radar 7. Here, the vehicle width w1 of the vehicle 1D may be defined as a distance from a left end to a right end of the vehicle 1D. In particular, when the vehicle 1D has side mirrors, the vehicle width w1 of the vehicle 1D may be defined as a distance from an end portion of a left side mirror of the vehicle 1D to an end portion of a right side mirror of the vehicle 1D.

Then, in step S22, the vehicle controller 3 specifies a road width w2 of a right side region of the vehicle 1C (host vehicle), based on the image data acquired from the camera 6 (in particular, the right side camera) and/or the detection data acquired from the radar 7. Here, the road width w2 of the right side region may be defined as a distance from the right end (the end portion of the right side mirror when the vehicle 1 has the side mirrors) of the vehicle 1C to a right guard rail G1. In the meantime, when the guard rail is not provided on the road R, the road width w2 may be defined as a distance from the right end of the vehicle 1C to an obstacle (for example, a wall of a private house, a telephone pole or the like).

Then, in step S23, the vehicle controller 3 determines whether the vehicle width w1 of the vehicle 1D is equal to or larger than the road width w2 of the right side region of the vehicle 1C. When it is determined that the vehicle width w1 is smaller than the road width w2 (NO in step S23), the vehicle controller 3 ends the processing. On the other hand, when it is determined that the vehicle width w1 is equal to or larger than the road width w2 (YES in step S23), processing of step S24 is executed.

Then, in step S24, the third illumination unit 42C of the vehicle 1C irradiates the laser light toward the front glass 120C of the vehicle 1D, thereby drawing a message M2 for urging stop of the vehicle 1D on the front glass 120C of the vehicle 1D (refer to FIG. 12). An example of the message M2 is "No Pass". In the meantime, the message M2 is preferably a message that can be intuitively visually recognized by the occupant in the vehicle 1D. For this reason, as shown in FIG. 12, the message M2 is difficult to be intuitively visually recognized when it is seen from an outside of the vehicle 1D. Also, the message M2 may be displayed as figure information or a combination of character information and figure information.

The processing of step S24 is specifically described. First, when it is determined that the vehicle width w1 is equal to or larger than the road width w2, the vehicle controller 3 of the vehicle 1C generates an instruction signal for instructing generation of the message M2 for urging stop of the vehicle 1D and transmits the instruction signal and position information of the front glass 120C of the vehicle 1D to the third illumination controller 45C. Then, the third illumination controller 45C controls the third illumination unit 42C so that the laser light is to be emitted from the third illumination unit 42C toward the front glass 120C of the vehicle 1D, in response to the instruction signal received from the vehicle controller 3. As a result, the message M2 is drawn on the front glass 120C of the vehicle 1D.

According to the second embodiment, the laser light is irradiated to the front glass 120C of the vehicle 1D, so that the message M2 is displayed on the front glass 120C of the vehicle 1D. In this way, the occupant in the vehicle 1D can visually recognize an intention of the vehicle 1C by seeing the message M2 displayed on the front glass 120C. Also, the occupant in the vehicle 1D can surely specify the vehicle 1C, which is the transmission source of the message M2, by seeing the third illumination unit 42C emitting the laser light. Therefore, it is possible to provide the vehicle system 2C and the illumination system 4C that enable rich visual communication between the vehicles.

Also, according to the second embodiment, when the vehicle width w1 of the vehicle 1D is equal to or larger than the road width w2, the message M2 for urging stop of the vehicle 1D is visually presented toward the vehicle 1D. In this way, the occupant in the vehicle 1D can recognize that the vehicle 1D should stop so as for the two vehicles to pass each other without any trouble (contact between two vehicles and the like). Therefore, in a situation where the two vehicles are difficult to pass each other, it is possible to enable the rich visual communication between the vehicles.

The vehicle 1C may visually present the message M2 toward the vehicle 1D and then narrow an interval between a left end of the vehicle 1C and a left guard rail G2, thereby increasing the road width w2 so that the vehicle width w1 of the vehicle 1D is to be smaller than the road width w2. Then, when the vehicle controller 3 of the vehicle 1C determines that the vehicle width w1 becomes smaller than the road width w2, the vehicle 1C may pass by the vehicle 1D. In the meantime, when it is determined that the vehicle 1C and the vehicle 1D are difficult to pass each other even though the interval between the left end of the vehicle 1C and the left guard rail G2 is narrowed to increase the road width w2, the vehicle controller 3 may move the vehicle 1C backward to a predetermined retreat place.

In the meantime, in the second embodiment, the processing of step S23 is executed by the vehicle controller 3. However, the processing of step S23 may be executed by the third illumination controller 45C. In this case, the vehicle controller 3 may transmit information about the vehicle width w1 of the vehicle 1D and information about the road width w2 to the third illumination controller 45C. Also, it is determined in the processing of step S23 whether the vehicle width w1 of the vehicle 1D is equal to or larger than the road width w2. However, the second embodiment is not limited thereto. For example, it may be determined whether a value (w1+α) obtained by adding a predetermined margin α to the vehicle width w1 is equal to or larger than the road width w2. Here, the margin α may be appropriately set depending on conditions of a road environment, a vehicle type and/or the autonomous driving mode.

Although the embodiments of the present disclosure have been described, it goes without saying that the technical scope of the present disclosure should not be interpreted limitedly by the descriptions of the embodiments. It will be understood by one skilled in the art that the embodiments are just exemplary and that the embodiments can be diversely changed within the scope of the invention defined in the claims. The technical scope of the present disclosure should be determined on the basis of the scope of the invention defined in the claims and its equivalent scope.

In the embodiments, the driving mode of the vehicle includes the fully autonomous driving mode, the advanced driving support mode, the driving support mode, and the manual driving mode. However, the driving mode of the vehicle should not be limited to the four modes. The classification of the driving mode of the vehicle may be appropriately changed, in accordance with laws or rules relating to the autonomous driving in each country. Likewise, the definitions of "the fully autonomous driving mode", "the advanced driving support mode" and "the driving support mode" described in the embodiments are just examples, and can be appropriately changed, in accordance with laws or rules relating to the autonomous driving in each country.

The aforementioned embodiments are summarized as follows.

An inter-vehicle communication system relating to one aspect of the present disclosure includes:

a first vehicle including a message generator configured to generate a message and a first wireless communication unit configured to wirelessly transmit the generated message;

a second vehicle including a second wireless communication unit configured to receive the message transmitted from the first vehicle; and a display device that is located in the second vehicle and is configured to display the message.

According to the above configuration, the message transmitted from the first vehicle is displayed on the display device located in the second vehicle. As a result, the occupant in the second vehicle can visually recognize an intention and the like of the first vehicle by seeing the message displayed on the display device. In this way, it is possible to provide the inter-vehicle communication system that enables rich visual communication between the vehicles.

In addition, the display device may be provided at a predetermined place in the second vehicle. Alternatively, the display device may be carried or worn by an occupant in the second vehicle.

According to the above configuration, the occupant in the second vehicle can visually recognize the intention and the like of the first vehicle by seeing the message displayed on the display device provided at the predetermined place of the second vehicle or carried or worn by the occupant.

In addition, the display device may be a head-up display (HUD) provided at the predetermined place in the second vehicle.

According to the above configuration, the occupant in the second vehicle can visually recognize the intention and the like of the first vehicle by seeing the message displayed on the HUD.

In addition, the first vehicle may further include: a first illumination unit configured to emit light toward an outside of the first vehicle; and a first illumination controller configured to, when the message is wirelessly transmitted, change an illumination feature of the first illumination unit.

According to the above configuration, when the message is wirelessly transmitted from the first vehicle, the illumination feature of the first illumination unit is changed. In this way, the occupant in the second vehicle can surely specify that a transmission source of the message displayed on the display device is the first vehicle by seeing the change in the illumination feature of the first illumination unit.

The first vehicle may further include: a second illumination unit configured to emit light toward an outside of the first vehicle, thereby forming a predetermined light pattern;

and a second illumination controller configured to, when the message is wirelessly transmitted, control the second illumination unit so that the predetermined light pattern is to be presented toward the second vehicle.

According to the above configuration, when the message is wirelessly transmitted from the first vehicle, the predetermined light pattern is presented toward the second vehicle. In this way, the occupant in the second vehicle can surely specify that the transmission source of the message displayed on the display device is the first vehicle by seeing the predetermined light pattern output from the first vehicle.

A vehicle system relating to one aspect of the present disclosure is provided for a first vehicle capable of traveling in an autonomous driving mode. The vehicle system includes: a message generator configured to generate a message that is to be displayed on a display device located in a second vehicle outside the first vehicle; and a wireless communication unit configured to wirelessly transmit the generated message.

According to the above configuration, the message transmitted from the first vehicle is displayed on the display device located in the second vehicle. For this reason, the occupant in the second vehicle can visually recognize the intention and the like of the first vehicle by seeing the message displayed on the display device. In this way, it is possible to provide the vehicle system that enables rich visual communication between the vehicles.

A vehicle illumination system relating to one aspect of the present disclosure is provided for a first vehicle capable of traveling in an autonomous driving mode. The vehicle illumination system includes: a third illumination unit configured to emit laser light toward an outside of the first vehicle; and a third illumination controller configured to cause the third illumination unit to irradiate the laser light to a front glass of a second vehicle outside the first vehicle, thereby displaying a message on the front glass.

According to the above configuration, the laser light is irradiated to the front glass of the second vehicle outside the first vehicle, so that the message is displayed on the front glass of the second vehicle. In this way, the occupant in the second vehicle can visually recognize the intention and the like of the first vehicle by seeing the message displayed on the front glass. Also, the occupant in the second vehicle can surely specify the first vehicle, which is the transmission source of the message, by seeing the third illumination unit emitting the laser light. Therefore, it is possible to provide the vehicle illumination system that enables rich visual communication between the vehicles.

A vehicle relating to one aspect of the present disclosure includes the aforementioned vehicle illumination system and is capable of traveling in an autonomous driving mode.

According to the above configuration, it is possible to provide the vehicle that enables rich communication between the vehicles.

According to the present disclosure, it is possible to provide the inter-vehicle communication system, the vehicle system, the vehicle illumination system and the vehicle that enable rich visual communication between the vehicles.

What is claimed is:

1. An inter-vehicle communication system, comprising:
a first vehicle comprising a message generator configured to generate a message and a first wireless communication unit configured to wirelessly transmit the generated message;
a second vehicle comprising a second wireless communication unit configured to receive the message transmitted from the first vehicle;
a display device that is located in the second vehicle and is configured to display the message;
a first illumination unit of the first vehicle that emits light toward an outside of the first vehicle; and
a first illumination controller of the first vehicle that, when the message is wirelessly transmitted, change an illumination feature of the first illumination unit.

2. The inter-vehicle communication system according to claim 1, wherein the display device is provided at a predetermined place in the second vehicle, or is carried or worn by an occupant in the second vehicle.

3. The inter-vehicle communication system according to claim 2, wherein the display device is a head-up display (HUD) provided at the predetermined place in the second vehicle.

4. The inter-vehicle communication system according to claim 1, wherein the first vehicle further comprises:
a second illumination unit configured to emit light toward an outside of the first vehicle, thereby forming a predetermined light pattern; and
a second illumination controller configured to, when the message is wirelessly transmitted, control the second illumination unit so that the predetermined light pattern is to be presented on a road surface toward the second vehicle.

5. A vehicle system provided for a vehicle capable of traveling in an autonomous driving mode, the vehicle system comprising:
a message generator configured to generate a message that is to be displayed on a display device located in another vehicle outside the vehicle;
a wireless communication unit configured to wirelessly transmit the generated message;
a first illumination unit that emits light toward an outside of the first vehicle; and
a first illumination controller that, when the generated message is wirelessly transmitted, change an illumination feature of the first illumination unit.

6. A vehicle illumination system provided for a vehicle capable of traveling in an autonomous driving mode, the vehicle illumination system comprising:
a third illumination unit configured to emit laser light toward an outside of the vehicle; and
a third illumination controller configured to cause the third illumination unit to irradiate the laser light to a front glass of another vehicle outside the vehicle, thereby displaying a message on the front glass.

7. A vehicle comprising the vehicle illumination system according to claim 6 and capable of traveling in an autonomous driving mode.

* * * * *